(12) United States Patent  
Molinar et al.

(10) Patent No.: US 8,328,648 B2  
(45) Date of Patent: Dec. 11, 2012

(54) CARDAN JOINT ASSEMBLY AND A CARDAN JOINT PROTECTOR DEVICE

(75) Inventors: Sergio R. Molinar, Freeland, MI (US); Kevin Gerzseny, Mt. Morris, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 156 days.

(21) Appl. No.: 12/952,833

(22) Filed: Nov. 23, 2010

(65) Prior Publication Data

US 2012/0129615 A1    May 24, 2012

(51) Int. Cl.  
*F16D 3/84* (2006.01)
(52) U.S. Cl. .................. 464/136; 464/170; 248/300
(58) Field of Classification Search .......... 464/134–136, 464/170; 248/300, 311.2, 312; 74/609; 403/11  
See application file for complete search history.

(56) References Cited

U.S. PATENT DOCUMENTS

| | | | |
|---|---|---|---|
| 725,586 A * | 4/1903 | Pool | 248/300 X |
| D176,703 S * | 1/1956 | Snively | 248/300 X |
| 4,031,664 A * | 6/1977 | Wendt | 248/300 X |
| 4,511,344 A | 4/1985 | Krude | |
| 4,576,382 A | 3/1986 | Scharting et al. | |
| 7,241,068 B2 * | 7/2007 | Aota et al. | 464/134 X |

* cited by examiner

*Primary Examiner* — Gregory Binda  
(74) *Attorney, Agent, or Firm* — Cantor Colburn LLP

(57) ABSTRACT

A cardan joint assembly and a cardan joint protector device are provided. The device includes a U-shaped bracket having an arcuate-shaped portion and first and second end portions extending from opposite ends of the arcuate-shaped portion. The first and second end portions have first and second apertures, respectively, extending therethrough. The device further includes a first elongated plate portion extending from the first end portion of the U-shaped bracket and further extending generally outwardly relative to a longitudinal axis. The first elongated plate portion at least partially covers a needle bearing of a cardan joint. The device further includes an attachment portion attached to a top edge of the first elongated plate portion that has a distal end that is disposed in a groove of a gear clamp yoke of the cardan joint.

5 Claims, 5 Drawing Sheets

CARDAN JOINT ASSEMBLY AND A CARDAN JOINT PROTECTOR DEVICE

FIELD OF THE INVENTION

The subject invention relates to a cardan joint assembly and a cardan joint protector device.

BACKGROUND

Cardan joints have been utilized in vehicle steering systems. A problem with cardan joints is that road debris can strike and degrade the cardan joint. Also, some of the road debris may become embedded on the cardan joint which increases a turning effort of a vehicle steering system.

Accordingly, it is desirable to provide a cardan joint assembly having a cardan joint protector device that deflects road debris from the cardan joint assembly.

SUMMARY OF THE INVENTION

A cardan joint protector device in accordance with an exemplary embodiment is provided. The cardan joint protector device includes a U-shaped bracket having an arcuate-shaped portion and first and second end portions extending from opposite ends of the arcuate-shaped portion. The first and second end portions have first and second apertures, respectively, extending therethrough. The cardan joint protector device further includes a first elongated plate portion extending from the first end portion of the U-shaped bracket and further extending generally outwardly relative to a longitudinal axis. The first elongated plate portion is configured to at least partially cover a needle bearing of a cardan joint. The cardan joint protector device further includes an attachment portion attached to a top edge of the first elongated plate portion and proximate to the first end portion and extending toward the second end portion. A distal end of the attachment portion is configured to be disposed in a groove of a gear clamp yoke of the cardan joint.

A cardan joint assembly in accordance with another exemplary embodiment is provided. The cardan joint assembly includes a cardan joint and a cardan joint protector device configured to be coupled to the cardan joint. The cardan joint protector device includes a U-shaped bracket having an arcuate-shaped portion and first and second end portions extending from opposite ends of the arcuate-shaped portion. The first and second end portions have first and second apertures, respectively, extending therethrough. The cardan joint protector device further includes a first elongated plate portion extending from the first end portion of the U-shaped bracket and further extending generally outwardly relative to a longitudinal axis. The first elongated plate portion is configured to at least partially cover a needle bearing of the cardan joint. The cardan joint protector device further includes an attachment portion attached to a top edge of the first elongated plate portion and proximate to the first end portion and extending toward the second end portion. A distal end of the attachment portion is configured to be disposed in a groove of a gear clamp yoke of the cardan joint.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
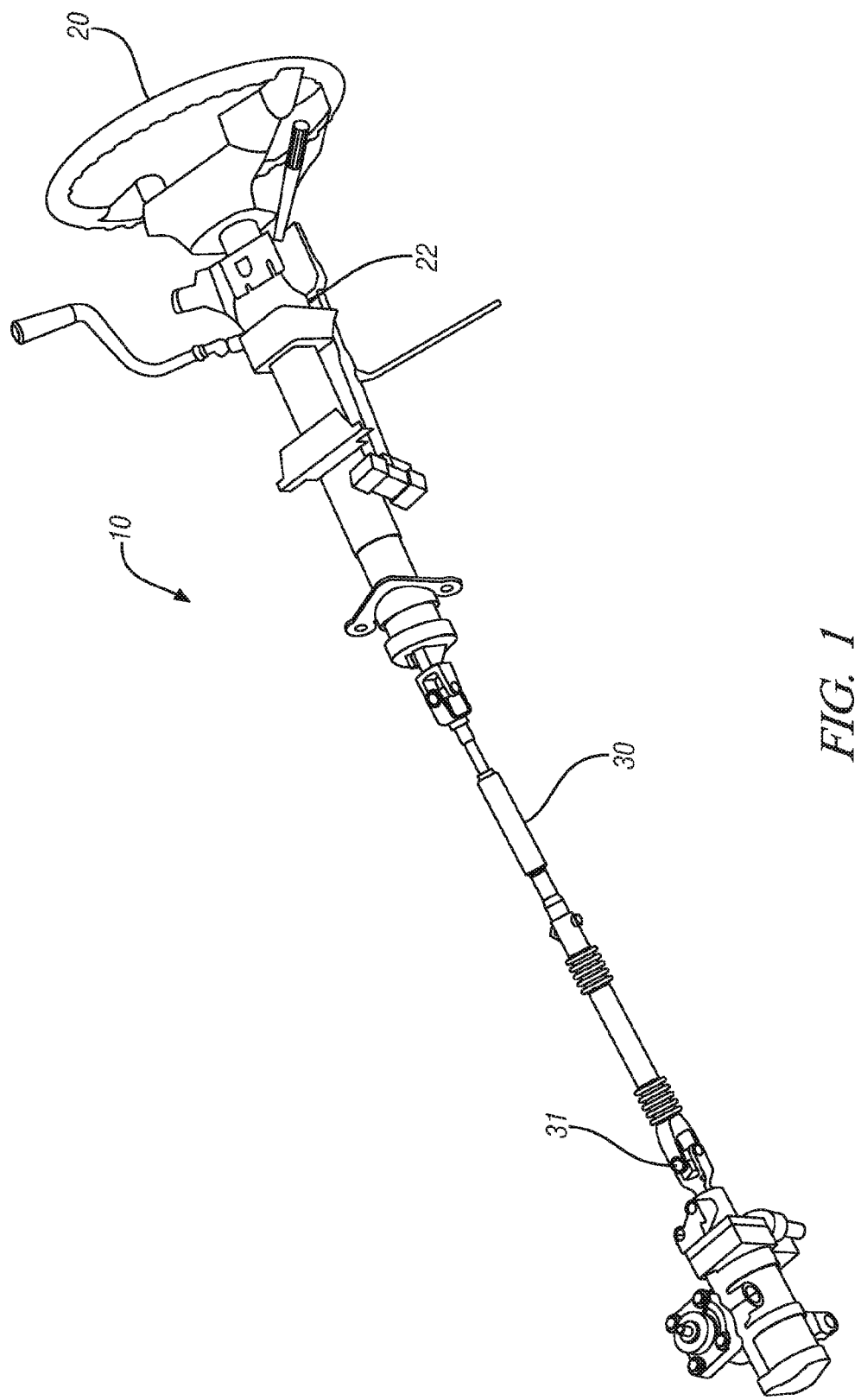
FIG. 1 is a schematic of an exemplary vehicle steering system.

Referring to FIG. 1, an exemplary vehicle steering system 10 is illustrated. The vehicle steering system 10 includes a steering wheel 20, a steering column 22, an intermediate shaft 30, and a cardan joint 31. When a user applies rotational torque to the steering wheel 20, the torque is transferred through the steering column 22 and the intermediate shaft 30 to the cardan joint 31.

Figure 2:
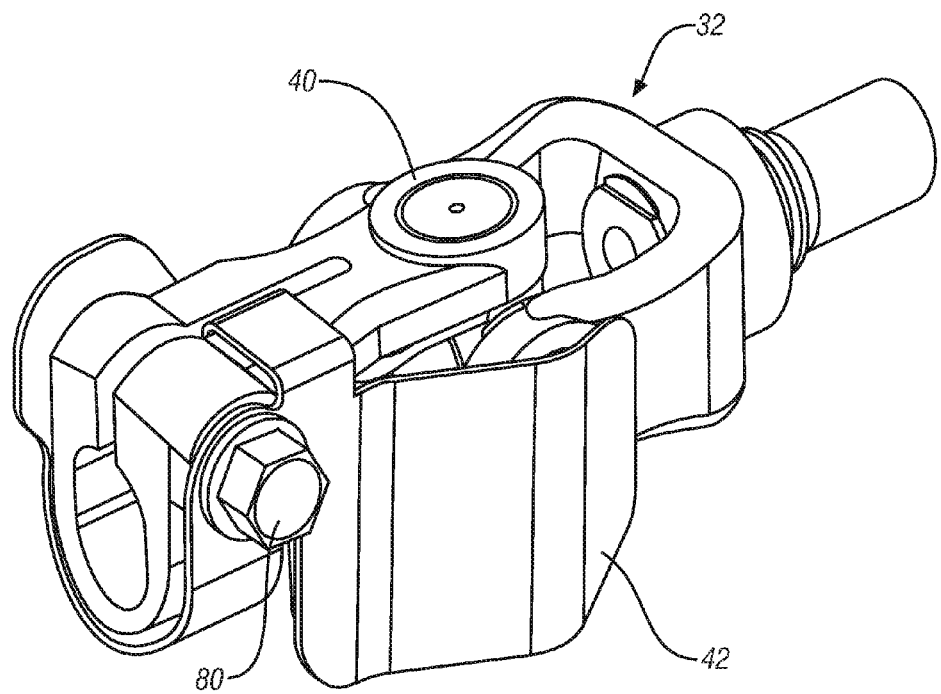
FIG. 2 is a schematic of a cardan joint assembly in accordance with an exemplary embodiment that can be utilized in the vehicle steering system of FIG. 1.
Figure 3:
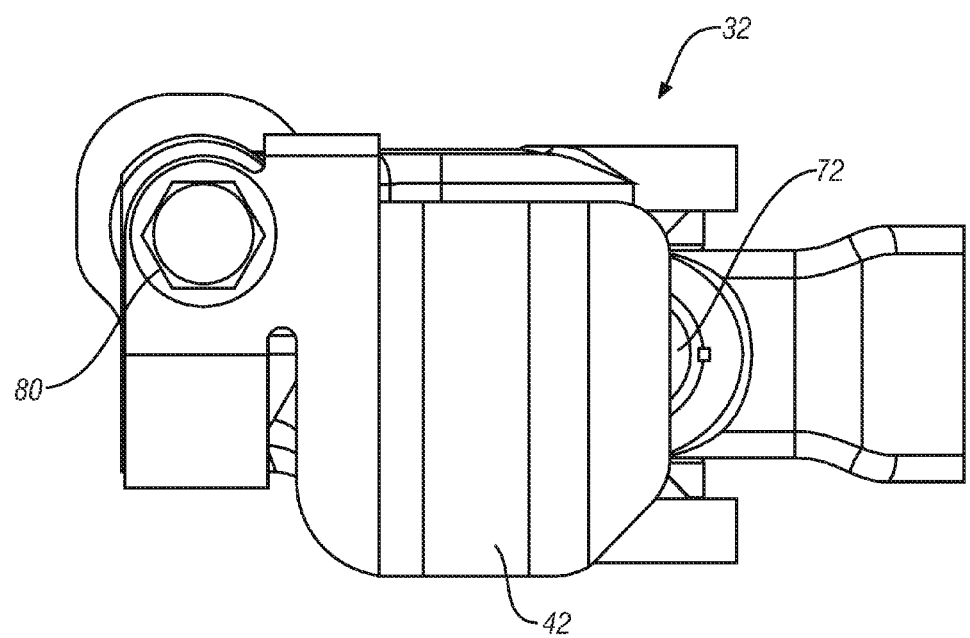
FIG. 3 is a side view of the cardan joint assembly of FIG. 2.

Referring to FIGS. 2 and 3, the cardan joint assembly 32 in accordance with an exemplary embodiment can be used to replace the cardan joint 31 in the vehicle steering system 10. The cardan joint assembly 32 includes a cardan joint 40 and a cardan joint protector device 42. An advantage of the cardan joint assembly 32 is that the assembly 32 can deflect road debris away from bearings utilized in the cardan joint 40 to prevent degradation of the cardan joint 40 from the road debris.

Figure 4:
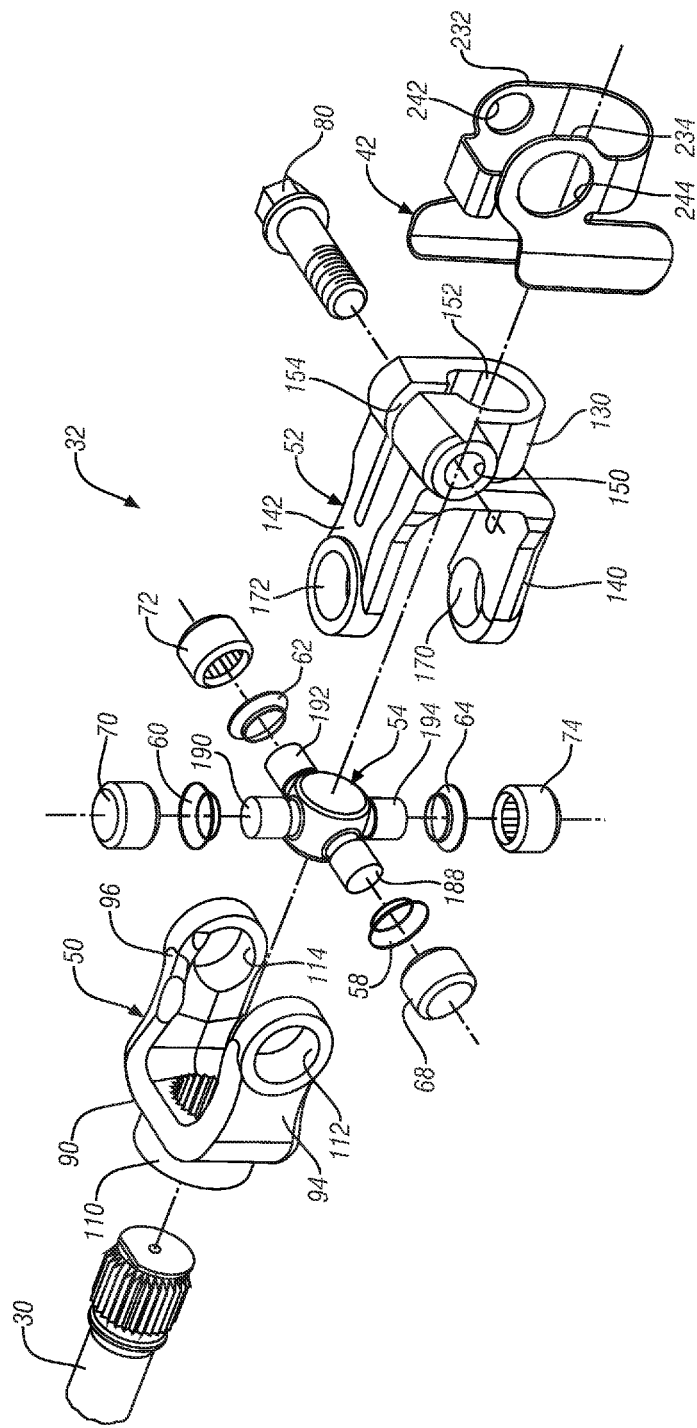
FIG. 4 is an exploded view of the cardan joint assembly of FIG. 2.

Referring to FIG. 4, the cardan joint 40 includes a stake yoke 50, a gear clamp yoke 52, a central hub 54, face seals 58, 60, 62, 64, needle bearings 68, 70, 72, 74, and a bolt 80. The gear clamp yoke 52 can rotate about a first axis defined by arm portions 190, 194 of the central hub 54 utilizing the bearings 70, 74, respectively. Further, the gear clamp yoke 52 can rotate about a second axis defined by the arm portions 188, 192 of the central hub 54 utilizing the bearings 68, 72, respectively.

The stake yoke 50 includes a central body 90 and arm portions 94, 96 extending outwardly from the central body 90 generally in a first direction. The central body 90 has an aperture 110 extending therethrough for receiving an end portion of the intermediate shaft 30 therein. The arm portion 94 has an aperture 112 extending therethrough for receiving the needle bearing 68 therein for coupling to the face seal 58, and the arm portion 188 of the central hub 54. The arm portion 96 has an aperture 114 extending therethrough for receiving the needle bearing 72 therein for coupling to the face seal 62, and the arm portion 192 of the central hub 54.

The gear clamp yoke 52 includes a central body 130 and arm portions 140, 142 extending outwardly from the central body 130 generally in a second direction. The central body 130 has an aperture 152 extending therethrough for receiving an end portion of another shaft therein. The central body 130 also has an aperture 150 extending therethrough for receiving a bolt 80 therethrough for coupling the cardan joint protector device 42 to the gear clamp yoke 52. The central body 130 further includes a groove 154 that also extends into a portion of the arm portion 142. The arm portion 140 has an aperture 170 extending therethrough for receiving the needle bearing 74 therein for coupling to the face seal 64, and the arm portion

194 of the central hub 54. The arm portion 142 has an aperture 172 extending therethrough for receiving the needle bearing 70 therein for coupling to the face seal 60, and the arm portion 190 of the central hub 54.

The central hub 54, which is also referred to as a cardan joint cross or spider, is coupled to the stake yoke 50 and the gear clamp yoke 52 via the needle bearings 68, 70, 72, 74. The central hub 54 includes a body portion 180 having arm portions 188, 190, 192, 194 extending outwardly from the body portion 180. The arm portions 188, 192 are centered about a first axis, and the arm portions 190, 194 are centered about a second axis.

The face seal 58 is coupled between the needle bearing 68 and the arm portion 188, and the face seal 60 is coupled between the needle bearing 70 and the arm portion 190. The face seal 62 is coupled between the needle bearing 72 and the arm portion 192, and the face seal 64 is coupled between the needle bearing 74 and the arm portion 194.

The needle bearings 68, 72 are disposed in the apertures 112, 114, respectively, of the stake yoke 50 and allow the central hub 54 to rotate about the second axis. The needle bearings 70, 74 are disposed in the apertures 172, 170, respectively, of the gear clamp yoke 52 and allow the central hub 54 to rotate about the first axis. The bolt 80 is utilized to couple the cardan joint protector plate 42 to the gear clamp yoke 52.

Referring to FIGS. 5-8, the cardan joint protector device 42 in accordance with an exemplary embodiment is configured to deflect road debris away from the cardan joint 40. The cardan joint protector device 42 is constructed of steel and includes a U-shaped bracket 200, an elongated plate portion 202, an attachment portion 210, and an elongated plate portion 212.

The U-shaped bracket 200 has an arcuate-shaped portion 230 and first and second end portions 232, 234 extending from opposite ends of the arcuate-shaped portion 230. The first and second end portions 232, 234 have first and second apertures 242, 244, respectively, extending therethrough.

Figure 5:
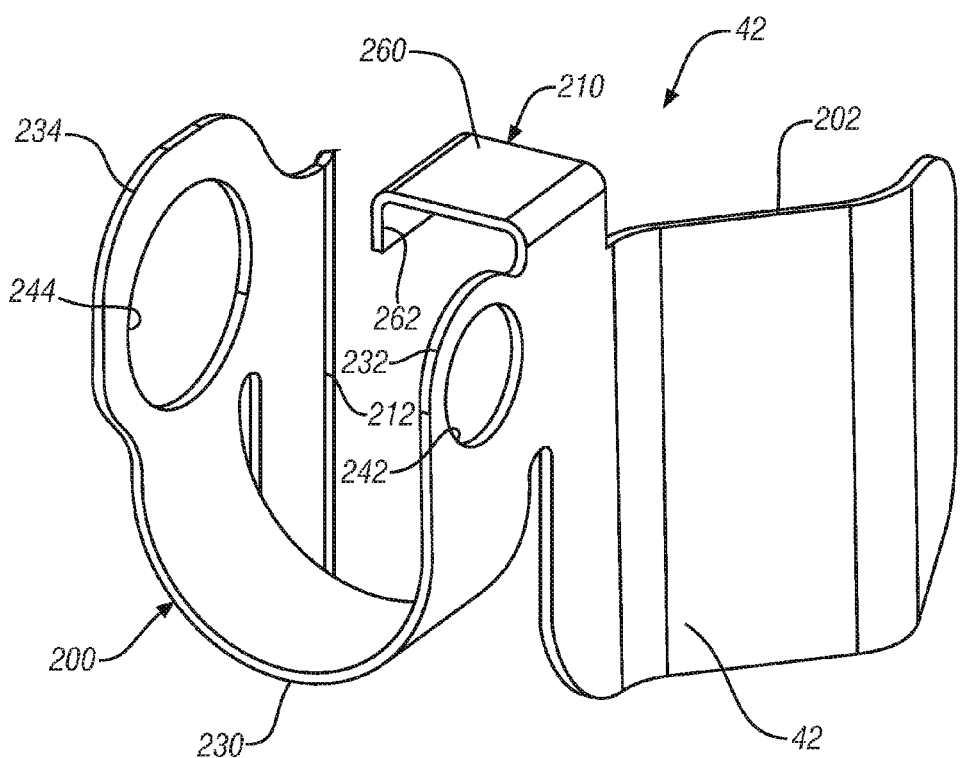
FIG. 5 is a schematic of a cardan joint protector device utilized in the cardan joint assembly of FIG. 2.
Figure 6:
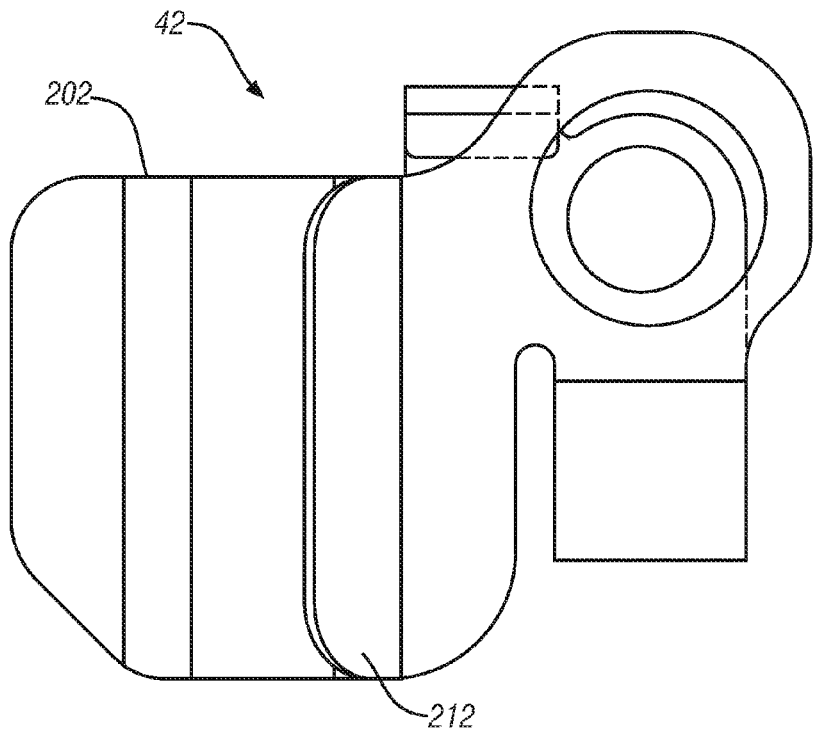
FIG. 6 is a side view of the cardan joint protector device of FIG. 5.
Figure 7:
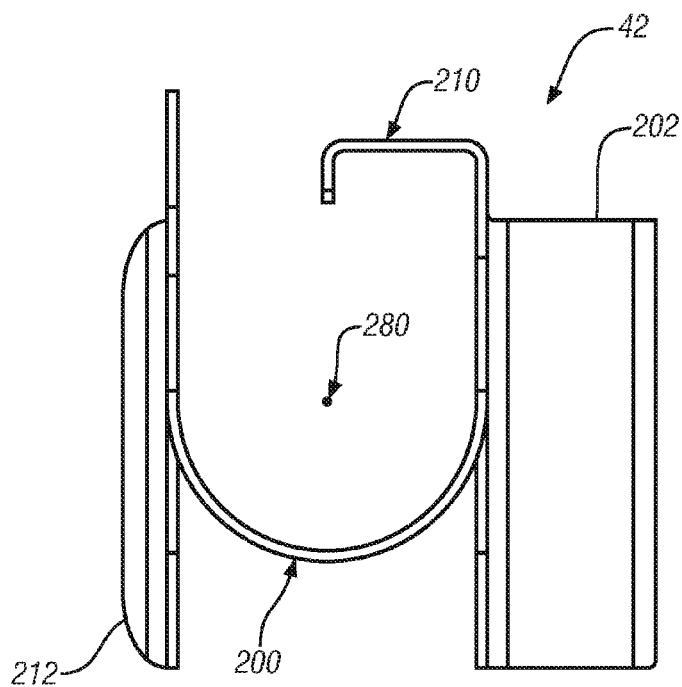
FIG. 7 is a front view of the cardan joint protector device of FIG. 5.
Figure 8:
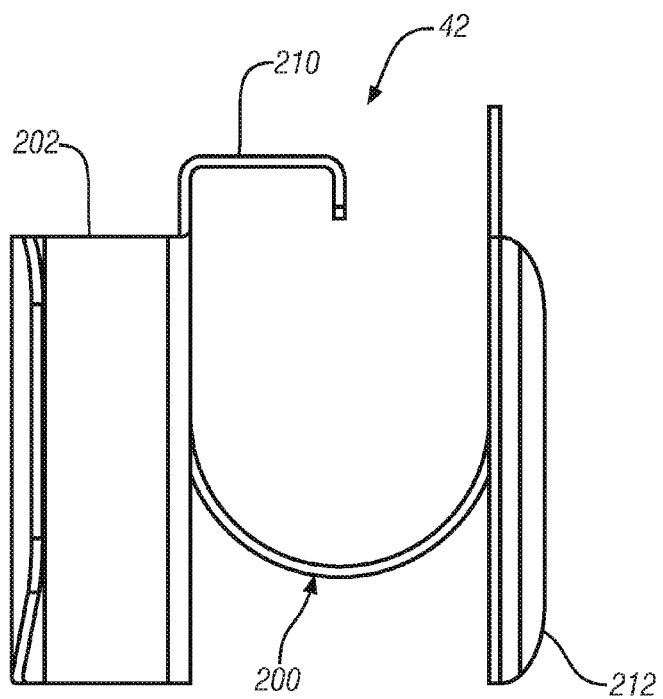
FIG. 8 is a rear view of the cardan joint protector device of FIG. 5.

Referring to FIGS. 3 and 5, the first elongated plate portion 202 extends from the first end portion 232 of the U-shaped bracket 200 and further extends generally outwardly relative to a longitudinal axis 280 (shown extending into the page on FIG. 7). The first elongated plate portion 202 has a generally wave-shaped profile and is configured to at least partially cover the needle bearing 72 of the cardan joint 40.

Referring to FIGS. 4 and 5, the attachment portion 210 is attached to a top edge of the first elongated plate portion 202 and is located proximate to the first end portion 232 and extends toward the second end portion 234. A distal end 262 of the attachment portion 210 is configured to be disposed in a groove 154 of the gear clamp yoke 52 of the cardan joint 40.

The second elongated plate portion 212 extends from the second end portion 234 of the U-shaped bracket 200 and further extends in a generally transverse direction relative to the longitudinal axis 280.

Referring to FIG. 4, the cardan joint protector device 42 is coupled to the cardan joint 40 utilizing the bolt 80 which extends through the aperture 242 of the cardan joint protector device 42, the aperture 150 of the gear clamp yoke 52, and the aperture 244 of the cardan joint protector device 42. A nut (not shown) may be threaded on the end of the bolt 40 proximate to the second end portion 234.

The cardan joint assembly 32 and the cardan joint protector device 42 provide a substantial advantage over other cardan joints. In particular, the cardan joint protector device 42 provides a technical effect of deflecting road debris away from bearings in the cardan joint assembly.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A cardan joint protector device, comprising:
   a U-shaped bracket having an arcuate-shaped portion and first and second end portions extending from opposite ends of the arcuate-shaped portion, the first and second end portions having first and second apertures, respectively, extending therethrough;
   a first elongated plate portion extending from the first end portion of the U-shaped bracket and further extending generally outwardly relative to a longitudinal axis, the first elongated plate portion configured to at least partially cover a needle bearing of a cardan joint; and
   an attachment portion attached to a top edge of the first elongated plate portion and proximate to the first end portion and extending toward the second end portion, a distal end of the attachment portion configured to be disposed in a groove of a gear clamp yoke of the cardan joint, wherein the first elongated plate portion has a generally wave-shaped profile.

2. The cardan joint protector device of claim 1, further comprising a second elongated plate portion extending from the second end portion of the U-shaped bracket and further extending in a generally transverse direction relative to the longitudinal axis.

3. A cardan joint assembly, comprising:
   a cardan joint;
   a cardan joint protector device configured to be coupled to the cardan joint having:
   a U-shaped bracket having an arcuate-shaped portion and first and second end portions extending from opposite ends of the arcuate-shaped portion, the first and second end portions having first and second apertures, respectively, extending therethrough;
   a first elongated plate portion extending from the first end portion of the U-shaped bracket and further extending generally outwardly relative to a longitudinal axis, the first elongated plate portion configured to at least partially cover a needle bearing of the cardan joint; and
   an attachment portion attached to a top edge of the first elongated plate portion and proximate to the first end portion and extending toward the second end portion, a distal end of the attachment portion configured to be disposed in a groove of a gear clamp yoke of the cardan joint.

4. The cardan joint assembly of claim 3, wherein the cardan joint protector device further comprises a second elongated plate portion extending from the second end portion of the U-shaped bracket and further extending in a generally transverse direction relative to the longitudinal axis.

5. The cardan joint assembly of claim 3, wherein the first elongated plate portion has a generally wave-shaped profile.

* * * * *